United States Patent
Petschauer

[11] Patent Number: 5,941,043
[45] Date of Patent: Aug. 24, 1999

[54] LARGE-FORMAT FIRECLAY REFRACTORY BRICK AND METHOD FOR ITS PRODUCTION

[75] Inventor: Hans Petschauer, Grossalmerode, Germany

[73] Assignee: VGT Industriekeramik GmbH, Grossalmerode, Germany

[21] Appl. No.: 08/743,193

[22] Filed: Nov. 5, 1996

[30] Foreign Application Priority Data

Dec. 28, 1995 [DE] Germany .......................... 195 49 057

[51] Int. Cl.$^6$ .................. E04C 1/40; C04B 35/19
[52] U.S. Cl. ................... 52/612; 427/397.8; 501/127
[58] Field of Search .................... 501/127, 128, 501/129, 130, 131, 133, 94; 427/397.8, 397.7, 372.2; 52/596, 612; 106/705, 636, 287.34

[56] References Cited

U.S. PATENT DOCUMENTS

| | | | |
|---|---|---|---|
| 3,940,516 | 2/1976 | Gierek et al. | 427/397.7 |
| 5,372,640 | 12/1994 | Schwarz et al. | 106/705 |
| 5,407,875 | 4/1995 | Petschauer | 501/127 |

FOREIGN PATENT DOCUMENTS

| | | |
|---|---|---|
| 42 06 734 C2 | 9/1993 | Germany . |
| 43 13 020 A1 | 11/1994 | Germany . |
| 44 09 111 | 9/1995 | Germany . |
| 1 268 128 | 3/1972 | United Kingdom . |

*Primary Examiner*—Michael Safavi
*Attorney, Agent, or Firm*—Thomas, Kayden, Horstemeyer & Risley

[57] ABSTRACT

A large-format fireclay refractory brick (1), in particular bottom block in a tin bath, made of a material from the system $Al_2O_3$-$_{SiO2}$, consists of a block (2) having a top surface (3) contacting the tin bath when in use. The top surface (3) of the block (2) is covered with a coating (13) containing alkali silicate in order to form a separating layer on the top surface (3) of the block (2). The separating layer is adapted for glazing and acts as a capturing material for the sodium from the tin bath due to the decreased offer of $Al_2O_3$ and the increased offer of alkali and silica in the coating (13) compared with the material of the block (2).

10 Claims, 1 Drawing Sheet

LARGE-FORMAT FIRECLAY REFRACTORY BRICK AND METHOD FOR ITS PRODUCTION

FIELD OF THE INVENTION

The invention relates to a large-format fireclay refractory brick, in particular bottom block in a tin bath, made of a material from the system $Al_2O_3$—$SiO_2$, consisting of a block having a top surface contacting the tin bath. Such large-format fireclay refractory bricks have the form of a square stone block with a surface contacting the tin bath when in use. All of the six surfaces of such large-format fireclay refractory bricks after firing are subjected to a finishing operation by grinding, whereby the desired dimensions result.

BACKGROUND OF THE INVENTION

Such large-format fireclay refractory bricks serving for a lay out of the steel construction of a tin bath of flat glass facilities and being made from a material of the system $Al_2O_3$—$SiO_2$, are known from DE 42 06 734 C2. The here interesting part of the glass producing facility has a steel construction in its lower region, the steel construction being laid out with large-format fireclay refractory bricks. Thereby a production tub is formed being filled with liquid tin. The melted glass is poured out on the surface of the tin bath. The glass expands on the surface of the tin bath and is drawn as a thin band with substantial width over the surface of the tin bath. This is the known method of producing flat glass according to the float technique. The flat glass contains about 15% $Na_2O$. $Na_2O$ diffuses into the melted metal at the contacting surface between the glass and the liquid tin. In the tin bath sodium and atomic oxygen appear in a solved manner. The solubility of sodium and atomic oxygen in tin is a function of the temperature. Producing flat glass temperatures of about 1200° C. to 600° C. occur in the flow direction of the glass. Parts of the tin containing sodium contact the surfaces of the blocks of the fireclay refractory bricks due to thermically and mechanically induced floating of the liquid tin in the tin bath. Thereby an exchange of sodium occurs between the tin and the fireclay refractory bricks. The atomic sodium penetrates into the refractory material and reacts first on the siliciumdioxide of the glass phase of the fireclay refractory bricks generating sodiumoxide. Due to the reduction of phases containing sodiumdioxide the reduced parts of the fireclay refractory bricks show a grey to black colour.

The known fireclay refractory bricks being used in such glass producing facilities may have a length of 1000 mm, a width of 600 mm and a height of 300 mm. They are made from grains of different grading, clay and alkalialumosilicate. After firing mainly mullite, a little amount of cristoballite, and a glass phase are present. The amount of the glass phase of such a fireclay refractory brick is determined by the amount of sodiumoxide and potassiumoxide. These oxides substantially influence the chemical composition of the glass phase. This chemical composition is important for the forming of the kind of alumosilicate—nepheline or albite—during the presence of metallic sodium in layers close to the surface of the fireclay refractory brick. The thermical expansion factor of nepheline is about four times as much as the factor of mullite. This results in an enlargement and in a growing of the layers of the fireclay refractory brick being adjacent to the surface contacting the tin bath. Thereby these layers contact each other due to the rectangular shape of the bricks. Tension occurs.

On the other hand it is necessary to maintain the gaps between the grinded side surfaces of the fireclay refractory bricks as small as possible and thereby sealed in order to prevent the downward passage of the melted tin. Otherwise this would result in a damage of the steel construction holding the fireclay refractory bricks. Since the penetrating of the liquid tin in the gap cannot be avoided in all cases it is the steel construction which is cooled in order to freeze the liquid tin.

Due to the increase of volume of the layers of the bricks contacting the tin bath chipping off occurs with respect to these layers generating at the corners and edges of the surfaces contacting the tin bath. Since the ceramic material of the fireclay refractory bricks has a lower relative density than the tin floating of the chipped off material from the bricks within the tin bath in upward direction occurs. This may cause substantial trouble in the production of the flat glass.

SUMMARY OF THE INVENTION

It is the object of this invention to provide a large-format fireclay refractory brick of the type mentioned above, which has a substantially reduced trend to form feldspar or substitutes of feldspar in order to prevent chipping off when used as a lay out in a tin bath.

According to the invention, this object is realized with a fireclay refractory brick of the type mentioned above wherein the top surface of the block is covered with a coating containing alkali silicate in order to form a separating layer on the top surface of the block adapted for glazing and acting as a capturing material for the sodium from the tin bath due to the decreased offer of $Al_2O_3$ and the increased offer of alkali and silica in the coating compared with the material of the block.

The invention is based on the idea of arranging a coating on all of the surfaces of the block contacting the tin bath when in use, i.e. at least on the top surface and on parts of the side surfaces if the block is provided with a phase surrounding the top surface. The coating forms a thin glazing. The alkalis are use as a fluxing agent, especially in connection with an increased amount of $SiO_2$. The coating may consist of a painting, a distribution followed by drawing-off surplus material with the rule or a spraying or the like. The glazing generated from the coating should have a thickness of only parts of a mm, but on the other hand the glazing has to be anchored in the pores of the surface in a fixed manner. The generation of the glazing is favoured or made possible by a surplus offer of alkali and silica in the tin layer of the coating. The glazing has a small thickness also being small enough to prevent chipping off and floating phenomenons of parts from the glazing, i.e. called tadpoles. The coating and the glazing generated therefrom act as a capturing material and as a separating layer to atomic sodium so that the atomic sodium can penetrate from the tin bath into the layer of the coating or the glazing respectively, but not into the matrix of the material of the block. The effect of the separating layer results from the fact that due to the apply of the coating open pores are filled and thus a mechanical separating effect occurs. At the same time the coating is anchored within the pores of the surface of the block in a fixed manner. Due to making the coating in form of a thin layer dimensions of the layer are prevented which are typical for chipping-off and floating parts in the prior art. The attack of atomic sodium from the tin bath results in a generation of nepheline so that the arrangement of sodium in form of alkalis in a coating first seems to be absurd.

However, advantageously the thin separating layer results from the favouring to form a glazing. The separating layer protects layers arranged deeper in the material of the block from damaging consequences.

If the invention is used in connection with a phase surrounding the top surface of the block the coating extends over all of the surfaces contacting the tin bath when in use. Advantageously by the arrangement of a phase it is reached that the tensions and stresses between adjacent blocks in the steel construction are transferred to a region of the blocks which has a distance to the top surface and is located deeper in the material than the top surface contacting the tin bath. In addition, one or more grooves may be provided in the top surface contacting the tin bath, the grooves dividing the large-format surface of the block into a number of small-format surfaces. Doing this, which is especially useful in very large-format blocks, the large-format surface of the block is divided and the generated small-format surfaces are separated from each other and cannot transfer forces from one to the other. It is clear that the coating extend over the grooves also. But it is possible also to avoid the phase and locate grooves only on the top surface of the block. In this respect it seems to be useful to locate crossing grooves near to the edges of the blocks to create areas of the same size independent from the location in the middle of the top surface or adjacent the edges of the top surface.

The coating may contain alkali silicate and alumosilicate in fine grain sized form. Doing this it is possible to increase the viscosity of the generating glazing in order to prevent chipping-off phenomenons in form of the to tadpoles effect.

The coating may contain water glass or a solution of water glass, in particular sodium water glass and/or potassium water glass. Mixtures may be used also.

The coating should be applied to the top surface of the block in a layer having a thickness as thin as possible up to a maximum of 1 mm. The coating will penetrate deeper in the region of open pores in the surface of the block compared with other regions without open pores. A distribution of the coating material followed by drawing-off surplus material with the rule or a similar tool is useful to keep the coating as thin as possible.

In the coating the alkali silicate may be applied in an amount of about 50 to 60% by weight and the alumosilicate in an amount of about 50 to 40% by weight. The coating may contain $SiO_2$ in addition to the alkali silicate in order to vary the composition of the glazing. The fireclay refractory bricks may be coated in different manner depending on its place in the glass producing tub in order to form the glazing at relatively high temperatures at the beginning of the production tub (about 1000° C. or 1200° C.) or at relatively low temperatures at the end of the tub (about 600° C.) in the flow direction of the glass. The $SiO_2$ may be present in form of silica sol or in form of pyrogenic silica.

The block may comprise a phase and the coating has to cover the top surface contacting the tin bath and at least the parts of the side surfaces of the block formed by the phase. In addition, one or more grooves may be arranged in the top surface contacting the tin bath, the grooves dividing the large-format top surface into a number of smaller top surfaces.

In an inventive method for the production of a fireclay refractory brick a block is made of a material from the system $Al_2O_3$—$SiO_2$, formed, dried, fired and grinded to the desired dimensions. After grinding the block to the desired dimensions a coating containing alkali silicate is applied to the top surface of the block contacting the tin bath. The apply is performed by a painting, printing, spraying or the like.

The coating may be applied as described and the fireclay refractory brick may be mounted in the steel construction of the tub ready for use. But it is possible also to fix the coating to the top surface contacting the tin bath by a stove baking operation. This is done by a special temperature treatment. This is especially useful if blocks have to be produced which prior to its mounting in the steel construction of the flat glass tub are subjected to the influence of humidity for a longer period.

BRIEF DESCRIPTION OF THE DRAWINGS

The invention will be described and explained in greater detail with respect to preferred embodiments. The drawings show.

DETAILED DESCRIPTION

Figure 1:
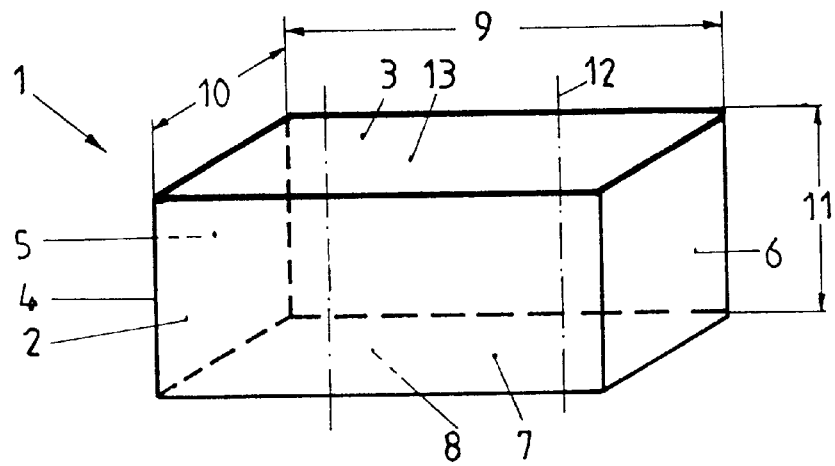
FIG. 1 a perspective view of a fireclay refractory brick in a first embodiment, and FIG. 2 a second embodiment of the fireclay refractory brick.

The fireclay refractory brick 1 illustrated in FIG. 1 has a block 2 in form of a square stone block or parallelepipedon respectively. The block 2 comprises six surfaces, i.e. a top surface 3, which contacts the tin bath, four side surfaces 4, 5, 6, 7 and a bottom surface 8 facing the steel construction of the flat glass facility, the steel construction being equipped with said fireclay refractory bricks 1. The fireclay refractory brick 1 has a length 9, a width 10 and a height 11. Since it is a large-format refractory brick it has a length 9 of about 1000 mm, a width 10 of about 600 mm and a height 11 of about 300 mm. It is clear that such large-format fireclay refractory bricks 1 may be manufactured having different dimensions also. The fireclay refractory brick 1 has bores extending over the height 11, symbolized by lines 12. These bores serve for fixing the fireclay refractory brick 1 to the steel construction in order to prevent a floating of the fireclay refractory brick 1 in the tin bath.

The top surface 3 facing the tin bath is provided with a coating 13. The coating 13 may be applied as a painting, a distribution or a spraying respectively. The coating 13 extends at least over all of the area of the top surface 3. It is no disadvantage if the coating extends over the edges between the top surface and the side surfaces. But it is important that the coating 13 covers the entire area of the top surface 3.

Figure 2:
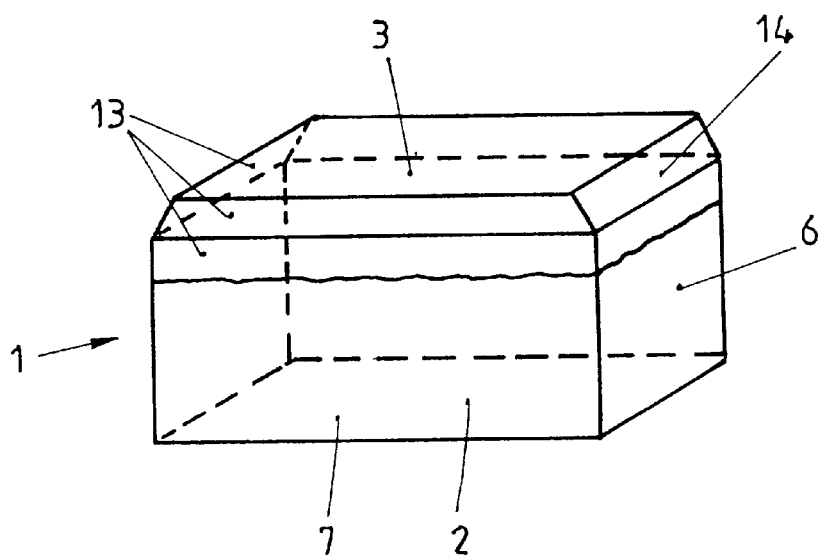

The block 2 of the embodiment of the fireclay refractory brick 1 illustrated in FIG. 2 shows a phase 14 extending around the edges of the top surface 3 contacting the tin bath, i.e. an inclined flattening extending only over a part of the height of the four side surfaces 4, 5, 6, 7. The phase 14 surrounds the top surface 3, i.e. is arranged at all of the four edges. It may be produced by grinding the parallelepipedon-shaped block 2. The phase 14 can have a depth of about 5 to 20 mm in the direction of the height 11 of the block and a width of about 1 to 8 mm in the direction of the length 9 or the width 10 respectively, always measured from the edge prior to grinding the phase 14. Here also the coating 13 is present. The coating 13 extend from the entire top surface 3 to the illustrated region of the side surfaces 4, 5, 6, 7, whereby the phase 14 is completely covered by the coating 13.

The manufacturing of such a fireclay refractory brick 1 will be explained with respect to two embodiments:

EXAMPLE 1

The fireclay refractory brick 1 is formed in known manner, pressed, dried as green compact and finally fired.

Subsequently the finishing to the desired dimensions is made, preferably by grinding. Then, the fireclay refractory brick 1 is provided at least on its top surface 3 contacting the tin bath when in use with a coating of a solution of sodium water glass or a mixture of sodium water glass and aluminium silicate. The aluminium silicates are applied in a very fine grinded form having a grain size <100 μ. The painting may be applied using a brush or a spatule respectively. It is useful to draw-off surplus material with the rule or a similar tool after painting in order to keep the thickness of the coating 13 as thin as possible. The solution of water glass or the mentioned mixture especially penetrates into the open pores of the block 2. The depth of penetration locally may be about 1 mm. A drying operation, for example at a temperature of about 100° C., occurs subsequent to the painting in order to fix the painting on the top surface 3.

Thus finished the fireclay refractory brick 1 may be mounted in the steel construction of the flat glass facility. Depending on its mounting place the block will be subjected to a temperature of its top surface between 1200° C. and 600° C. during flat glass production. Thereby atomic sodium penetrates from the tin bath into the painting or coating respectively. Under the influence of the temperature a layer of glass having a high viscosity is generated acting as a separating layer remaining thin and resulting in a sealing of the pores on the one hand. On the other hand the glazing formed from the coating is anchored in the pores of the top surface. Due to the presence of silica offered in surplus and the alkalis already contained in the coating 13 rapidly the generation of the glazing occurs in which the sodium penetrating from the tin bath is captured and incorporated in the glazing. Since the glazing forms a separating layer the matrix of the block 2 is substantially protected from sodium penetration.

EXAMPLE 2

The manufacture of the fireclay refractory brick 1 is similar to the method described in example 1. After applying of the coating 13 in form of a painting a stove baking follows at a temperature not exceeding about 1000° C. Thus the sodium silicate is melt on, but in a manner to prevent a reaction with the matrix of the block. Such a stove baking treatment is advantageous if the blocks are subjected to humid atmosphere for a longer period prior to their mounting in the steel construction of the tin bath. The glazing is generated by the stove baking operation making the blocks unsensitive to humidity.

While the foregoing specification and drawing set forth the preferred embodiments of the invention, it will be understood by those skilled in the art that variations and modifications thereof can be made without departing from the spirit and scope of the invention, as set forth in the following claims.

LIST OF REFERENCE NUMERALS

1—fireclay refractory brick
2—block
3—top surface
4—side surface
5—side surface
6—side surface
7—side surface
8—bottom surface
9—length
10—width
11—height
12—line
13—coating
14—phase

I claim:

1. A large format fire clay refractory block for use in a tin bath, the tin bath configured for floating flat glass on a surface thereof, said block comprising:

a material comprising a first amount, by weight, of $Al_2O_3$, a first amount, by weight, of $SiO_2$ and a first amount, by weight, of alkali silicate, said material configured with a first surface, said first surface being adapted for contacting a tin bath, said first surface having a coating, said coating comprising a second amount, by weight, of $Al_2O_3$, a second amount, by weight, of $SiO_2$ and second amount, by weight, of alkali silicate, said second amount of $Al_2O_3$ being less than said first amount of $Al_2O_3$, said second amount of alkali silicate being greater than said first amount of alkali silicate, said second amount of $SiO_2$ being greater than said first amount of $SiO_2$, and in response to heat, said coating forming a glazing, said glazing being adapted to resist a build-up of nepheline thereon and to capture sodium, such that during use of said block in a tin bath in the process of floating flat glass on a surface of the tin bath, said coating captures sodium given up from glass on the surface of the tin bath.

2. The large format fire clay refractory block of claim 1, wherein said coating contains said alkali silicate and alumosilicate in fine grain sized form.

3. The large format fire clay refractory block of claim 1, wherein said coating comprises at least one of the group consisting of water glass, a solution of water glass, sodium water glass and potassium water glass.

4. The large format fire clay refractory block of claim 3, wherein said coating is applied to said first surface of said block in a layer having a thickness up to a maximum of 1 mm.

5. The large format fire clay refractory block of claim 2, wherein said coating comprises said alkali silicate in an amount of about 50 to 60% by weight and said alumosilicate in an amount of about 50 to 40% by weight.

6. The large format fire clay refractory block of claim 5, wherein said coating contains $SiO_2$ in addition to said alkali silicate.

7. The large format fire clay refractory block of claim 6, wherein said $SiO_2$ is present in the form of silica sol.

8. The large format fire clay refractory block of claim 1, wherein said glazing has a separating layer for capturing sodium, said separating layer for preventing a diffusing of sodium into said material of said block and a chipping-off of nepheline from said separating layer.

9. The large format fire clay refractory block of claim 6, wherein said $SiO_2$ is present in the form of pyrogenic silica.

10. The large format fire clay refractory block of claim 4, wherein said first surface of said block has a top surface and a plurality of beveled surfaces surrounding and contacting said top surface, each of said plurality of beveled surfaces angled with respect to said top surface.

* * * * *